United States Patent
Feng et al.

(10) Patent No.: US 10,084,370 B2
(45) Date of Patent: Sep. 25, 2018

(54) ACTIVE STARTUP TIMING CONTROL AT FAULT MODE

(71) Applicant: DIALOG SEMICONDUCTOR INC., Campbell, CA (US)

(72) Inventors: Guang Feng, Campbell, CA (US); Pengju Kong, Campbell, CA (US); Kai-Wen Chin, Campbell, CA (US); Mingsheng Peng, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 0 days.

(21) Appl. No.: 15/683,326

(22) Filed: Aug. 22, 2017

(65) Prior Publication Data

US 2018/0205310 A1  Jul. 19, 2018

Related U.S. Application Data

(60) Provisional application No. 62/446,344, filed on Jan. 13, 2017.

(51) Int. Cl.
*H02M 1/36* (2007.01)
*H02M 1/32* (2007.01)
*H02M 3/335* (2006.01)

(52) U.S. Cl.
CPC ............... *H02M 1/32* (2013.01); *H02M 1/36* (2013.01); *H02M 3/33507* (2013.01); *H02M 2001/322* (2013.01)

(58) Field of Classification Search
CPC ........... H02M 1/36; H02M 2001/0006; H02M 2001/325; H02M 2001/322; H02M 3/335
See application file for complete search history.

(56) References Cited

U.S. PATENT DOCUMENTS

| | | | | |
|---|---|---|---|---|
| 6,002,598 A | * | 12/1999 | Seinen | H02M 1/36 363/20 |
| 9,431,892 B1 | * | 8/2016 | Li | H02M 1/36 |
| 9,742,262 B1 | * | 8/2017 | Jutras | H02M 1/36 |
| 2013/0077353 A1 | * | 3/2013 | Kuang | H02M 3/33507 363/20 |
| 2015/0003118 A1 | * | 1/2015 | Shin | H02M 1/36 363/21.12 |
| 2016/0344294 A1 | * | 11/2016 | Zhang | H02M 3/33507 |

* cited by examiner

*Primary Examiner* — Harry Behm
(74) *Attorney, Agent, or Firm* — Haynes and Boone, LLP

(57) ABSTRACT

A power switch transistor for a switching power converter is maintained on during a re-startup period by a zener breakdown voltage following a fault condition for the switching power converter. A source voltage from the power switch transistor is used to charge a VCC capacitor that stores a power supply voltage for a controller for the switching power converter.

18 Claims, 4 Drawing Sheets

ACTIVE STARTUP TIMING CONTROL AT FAULT MODE

CROSS-REFERENCE TO RELATED APPLICATIONS

This application claims priority to and the benefit of U.S. Provisional Patent Application No. 62/446,344, filed Jan. 13, 2017, which is hereby incorporated by reference in its entirety.

TECHNICAL FIELD

This application relates to switching power converter controllers, and more particularly to switching power converter controllers with active startup timing control.

BACKGROUND

The high efficiency of switching power converters such as a flyback converter has led to their virtual universal adaption as the battery charger for mobile devices. Since a flyback converter converts AC household voltage, fault conditions such as a short circuit may be potentially dangerous. It is thus conventional for a flyback converter controller to monitor for various fault conditions. Should the controller detect the presence of a fault condition, it stops cycling the power switch and enters a re-startup period. Upon the conclusion of the re-startup period, the controller will again resume normal operation. Should the fault condition reoccur, the controller will again stop cycling the power switch and begin another startup period. The duration of the startup period is thus rather important since if the fault is permanent, it will continually reoccur following each startup period. Should the startup period be too short in the presence of an output short circuit fault condition, the components of the flyback converter may be stressed or damaged by the heat and excessive currents resulting from such a repeated fault.

The duration of the re-startup period is thus essential to minimize power loss and avoid stress to switching power converter components following a fault condition. The re-startup period cannot be too short as discussed above. Conversely, the re-startup period should not be too long or it may exceed user requirements. However, conventional control of the re-startup period suffers from a number of flaws that may be better appreciated with reference to a conventional prior art switching power converter as illustrated in FIG. 1. A controller U1 controls the cycling of a power switch transistor S2 that is in series with a primary winding T1 of the flyback converter's transformer (not illustrated). Depending upon the load demands, controller U1 will switch on power switch transistor S2 through a drive signal applied to its gate. Power switch transistor S2 is in series with a current sense resistor R2 so that controller U1 may measure the primary winding current by sensing the voltage across the current sense resistor. An input voltage V_IN such as produced by rectification of an AC mains voltage drives the primary winding current when the power switch transistor S2 is cycled on.

Controller U1 receives its power supply voltage VCC from a VCC capacitor coupled between a source of a power supply voltage regulator switch transistor S1 and ground. The drain of power supply voltage regulator switch transistor S1 couples through a current limiting resistor R1 to the input voltage rail supplying the input voltage. When controller U1 cycles power supply voltage regulator switch transistor S1 on, the input voltage induces a current through current limiting resistor R1 and power supply voltage regulator switch transistor S1 to charge the VCC capacitor with the power supply voltage VCC. Should controller U1 have to re-start due to a fault condition, controller U1 manages the duration of the re-startup period through cycles of switching off and on power supply voltage regulator switch transistor S1. Each off and on cycle may be designated as a VCC recycling period since charge on the VCC capacitor is "recycled" as the power supply voltage VCC is drained to power controller U1. Some waveforms for the resulting re-startup period are shown in FIG. 2.

At the occurrence of the fault condition, controller U1 enters an initial or first VCC recycling period with the power supply voltage regulator switch transistor S1 off. During an initial portion of the VCC recycling period, controller U1 operates in an active mode such that it draws a relatively large current (Icc_high) from the VCC capacitor. The power supply voltage VCC thus drops relatively rapidly until it hits a threshold value Vcc_low. Controller U1 monitors the power supply voltage VCC to determine whether it has decreased to the Vcc_low threshold voltage, whereupon the controller cycles the power supply voltage regulator switch transistor S1 on. The power supply voltage VCC then begins to increase until it reaches a maximum value Vcc_st at which point controller U1 switches off power supply voltage regulator switch transistor S1. While the power supply voltage regulator switch transistor S1 is on, controller U1 functions in a dormant or sleep mode such that it draws virtually no current from the VCC capacitor.

Controller U1 repeats the VCC recycling period a total of N times to complete the desired re-startup period. Upon the conclusion of the re-startup period, controller U1 resumes normal operation. Re-startup timing control is thus implemented by controlling the number of the VCC recycling periods. In these conventional recycling periods, the duration of each recycling period is dominated by the charging of the VCC capacitor while the power supply voltage increases from Vcc_low to Vcc_st. This VCC charging time is controlled by the resistance of the current limiting resistor R1. This reliance on the current limiting resistor R1 to lengthen the charging time of the VCC capacitor makes the duration of the VCC recycling periods dependent on the input voltage V_IN. For example, when V_IN exceeds its rated voltage, the magnitude of the charging current charging the VCC capacitor increases which results in a shorter VCC recycling period. In turn, this results in a shortened re-startup period. Conversely, a decrease in the input voltage lengthens the duration of the recycling periods and the re-startup period. The prior art dependence on variations in V_IN is thus problematic in that the re-startup timing cannot be accurately predicted.

Accordingly, there is a need in the art for improved re-startup timing control techniques for switching power converters.

SUMMARY

To address the need in the art for an improved re-startup timing control, a controller is provided that actively controls a re-startup period following a fault condition by implementing a slow VCC discharge time that is independent of the input voltage to dominate the VCC recycling period. In this fashion, a reliable active re-startup timing control is possible regardless of the range of the input voltage. A reasonable and accurate re-startup period is thus achieved following a fault condition, which prevents switching power converter overstress. The slow VCC discharge period advantageously prevents an undesirable dependence on the input voltage with regard to controlling the duration of the re-startup period. These advantageous features may be better appreciated through a consideration of the following detailed description.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 1:
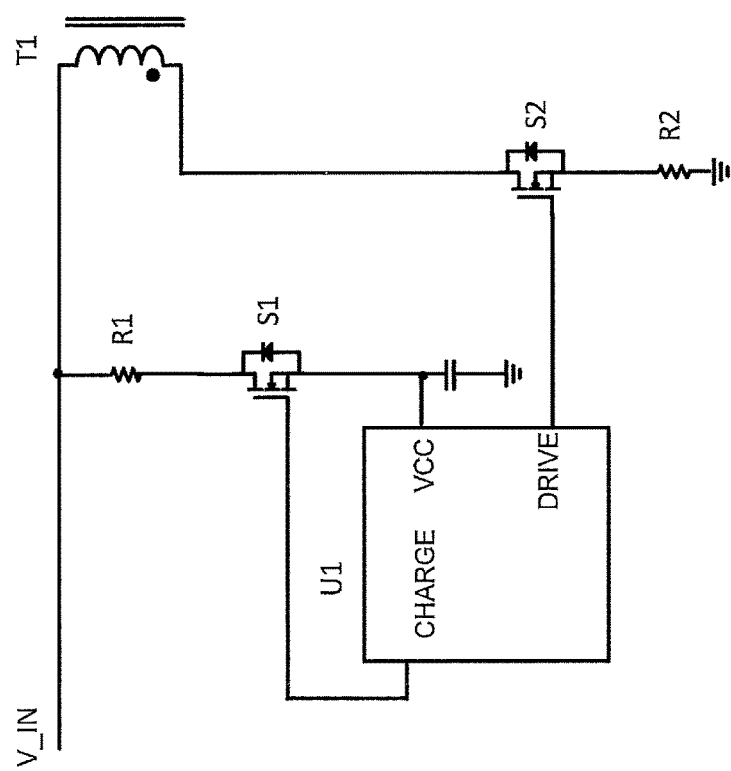
FIG. 1 is a diagram for a conventional switching power converter configured for startup timing control in accordance with an embodiment of the disclosure.
Figure 2:
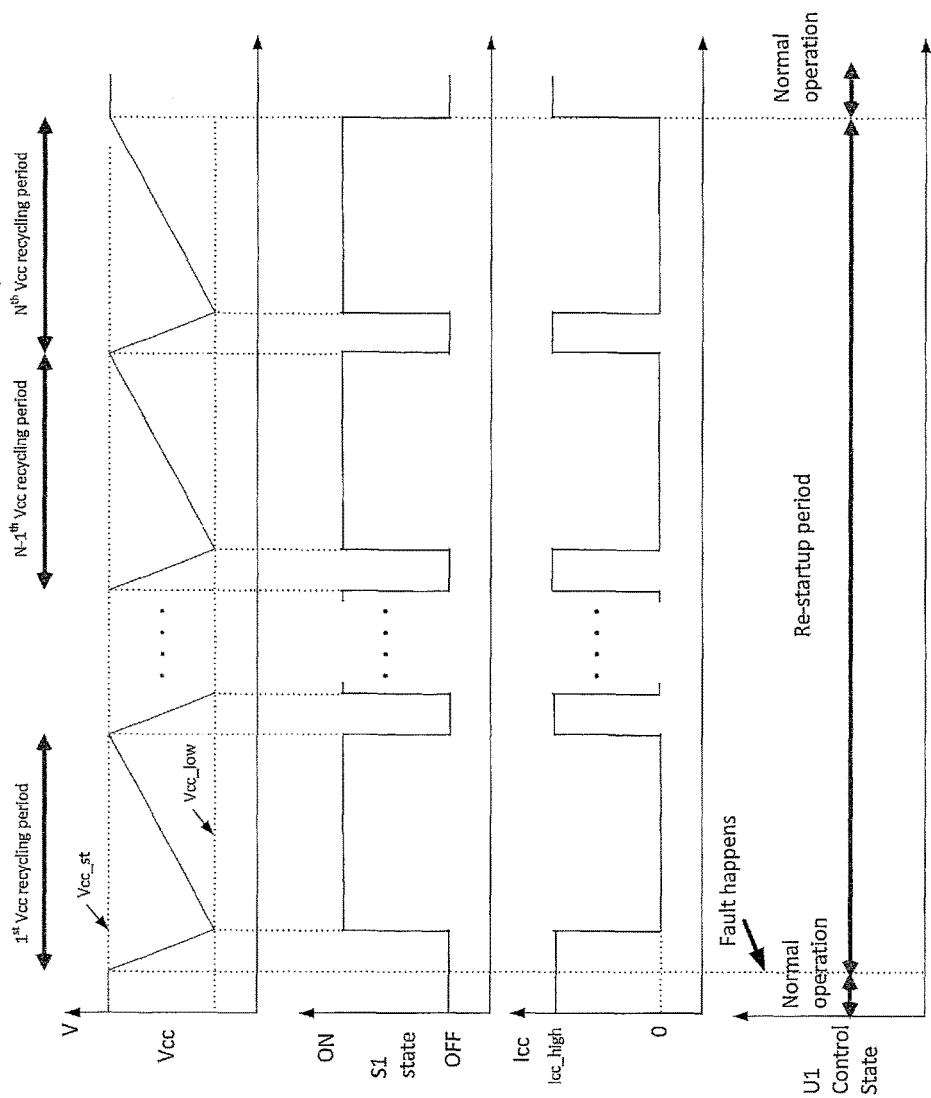
FIG. 2 illustrates waveforms for a conventional switching power converter with startup timing control in accordance with an embodiment of the disclosure.
Figure 3:
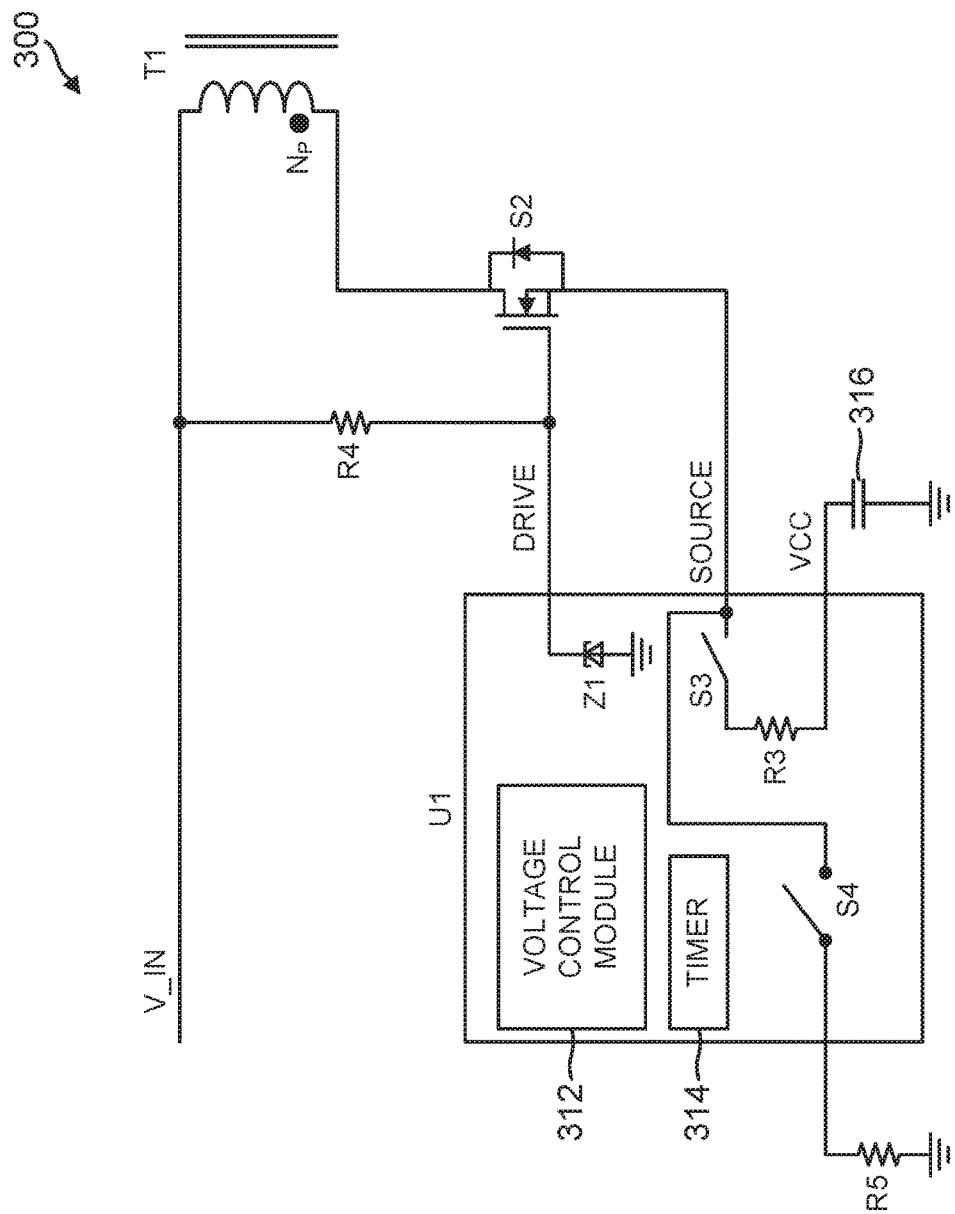
FIG. 3 is a diagram for a switching power converter configured for active startup timing control in accordance with an embodiment of the disclosure.

The following discussion will be directed to a flyback converter. However, it will be appreciated that the improved re-startup period disclosed herein may be implemented in other types of switching power converters such as a buck converter, a boost converter, or a buck-boost converter. An example flyback converter 300 configured for a re-startup period that is independent of the input voltage is shown in FIG. 3. As known in the flyback converter arts, flyback converter 300 includes a power switch transistor S2 in series with the primary winding of a transformer T1 and a controller U1 configured to control the on state and the off state of power transistor switch S2. During normal operations, controller U1 may maintain the output regulation of an output voltage for flyback converter 300 (for illustration brevity, the secondary side of the transformer is not illustrated in FIG. 3) by controlling the on and off states of power switch transistor S2 through a drive terminal of controller U1 coupled to a gate of power switch transistor S2. The primary winding has a number Np of coils. Power switch transistor S2 may be a field-effect transistor (FET) device (e.g., a metal oxide field-effect transistor (MOSFET) device), a bipolar junction transistor (BJT) device, or other appropriate switch transistor. During normal operation, when power switch transistor S2 is placed in the on state, an input voltage V_IN carried on an input voltage rail drives a magnetizing current or primary current into the primary winding of transformer T1. Based upon the input voltage and a magnetizing inductance for transformer T1, the primary current ramps up from zero Amperes (Amps) to a peak current value, whereupon controller U1 turns off power switch transistor S2 to complete a power cycle.

Controller U1 further includes a timer 314. A voltage control module 312 may comprise logic gates or a microcontroller. Timer 314 may comprise analog or digital circuitry. In additional embodiments, voltage control module 312 and timer 314 may be implemented using a combination of hardware, software, and/or firmware components.

At the detection of a fault condition such as an output short, controller U1 enters into a re-startup period. The re-startup period comprises a series of recycling periods in which voltage control module 312 cycles on and off a power supply voltage switch transistor S3 to regulate a power supply voltage VCC stored on a VCC capacitor 316. Power supply voltage switch transistor S3 couples between a source of power switch transistor S2 and a current limiting resistor R3. A cathode of a zener diode Z1 connects to a gate of power switch transistor S2 whereas an anode of zener diode Z1 connects to ground. The gate of power switch transistor S2 couples to the input voltage rail through a resistor R4. In some embodiments, zener diode Z1 may have a zener breakdown value of fifteen volts DC. The input voltage will typically be higher than such a value such that the gate of power switch transistor S2 will be charged to the zener breakdown voltage during the re-startup period. Should the power supply voltage switch transistor S3 be cycled on, the source of power switch transistor S2 will be lower than the zener breakdown voltage by the threshold voltage for power switch transistor S2 since power switch transistor S2 will be switched on due to the charging of its gate by the zener breakdown voltage. Advantageously, the source voltage of power switch transistor S2 is thus independent of variations in the input voltage but instead is determined by the zener breakdown voltage and the threshold voltage. Since the source voltage is what powers the charging of the VCC capacitor, the resulting charging of the power supply voltage VCC in each recycling period is independent of the input voltage.

During normal operation, the source of power switch transistor S2 couples to ground through a switch transistor S4 and a resistor R5. In response to a fault condition, switch transistor S4 is cycled off. Switch transistor S4 would then be cycled back on upon the conclusion of the re-startup period so that normal operation may proceed.

When power supply voltage switch transistor S3 is closed, the source voltage at power switch transistor S2 will cause charge to flow through the current limiting resistor R3 into the VCC capacitor to charge the power supply voltage VCC stored across the VCC capacitor. As will be explained further herein, a slow discharge period will dominate each recycling period. The resistance of current limiting resistor R3 may thus be relatively small such that the VCC capacitor charges relatively quickly to the high threshold voltage Vcc_st. In addition, controller U1 is configured to enter a sleep mode such as to draw virtually no current while power supply voltage switch transistor S3 is closed. The charging period during which power supply voltage switch transistor S3 is closed is thus quite short since the small resistance of current limiting resistor R3 will cause a relatively large amount of charge to flow into the VCC capacitor to charge the power supply voltage VCC from the low threshold voltage Vcc_low to the high threshold voltage Vcc_st. The recycling periods are thus dominated by the slow discharge times as measured by timer 314. Since the charging time of the power supply VCC during each recycling period is independent of the input voltage, each recycling period is controlled by timer 314 as will be explained further herein.

Figure 4:
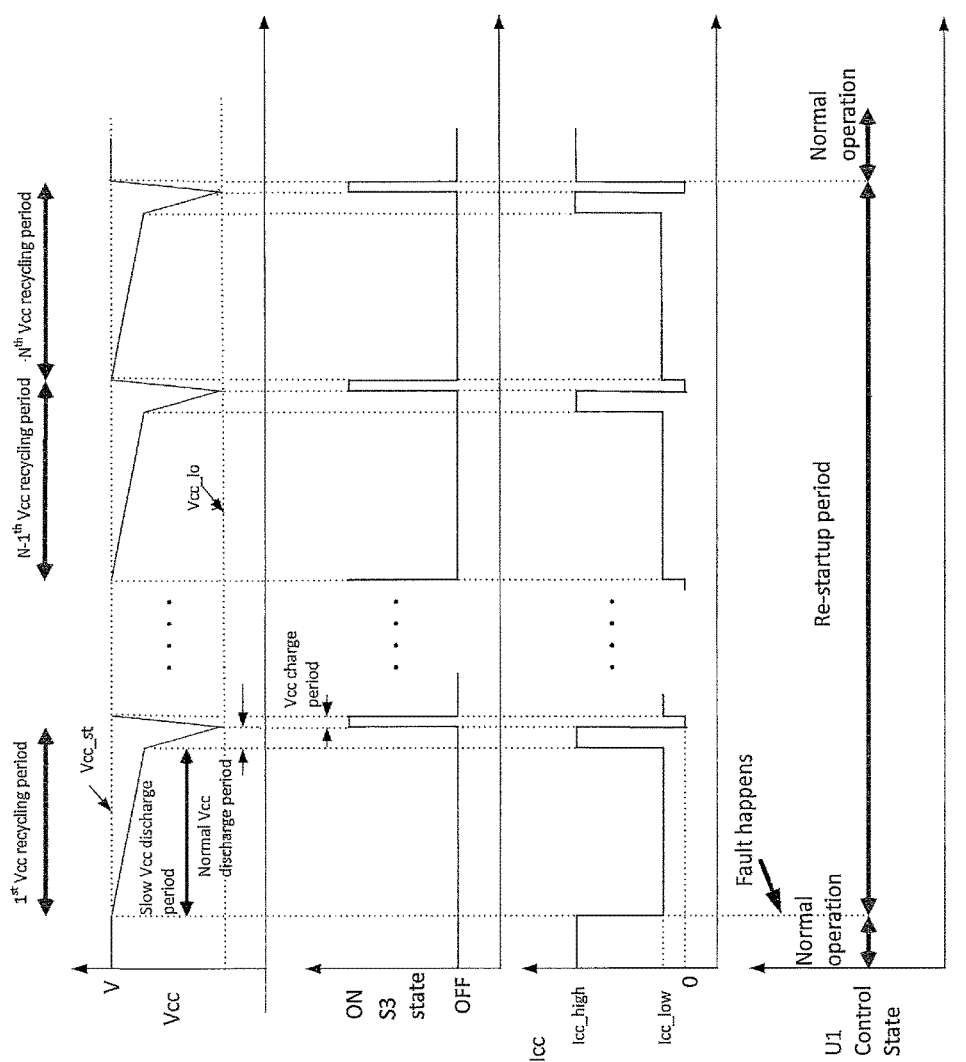
FIG. 4 illustrates waveforms for a switching power converter configured for active startup timing control in accordance with an embodiment of the disclosure.

The operation of flyback converter 300 during the re-startup period may be better understood with consideration of the waveforms shown in FIG. 4. During normal operation, voltage control module 312 places power supply voltage switch transistor S3 in the OFF state. VCC capacitor 316 is fully charged to the high threshold level Vcc_st and an Icc loading current drawn by controller U1 equals a high level Icc_high during normal operation of controller U1.

Following a detection of a fault condition, timer 314 begins timing a slow VCC discharge period in a first recycling period while voltage control module 312 turns off power supply voltage switch transistor S3. At the same time, controller U1 enters a low-power timing mode that merely supports the timing of the slow discharge period through timer 314. The Icc current drawn by controller U1 during the slow discharge period is thus reduced to Icc_low during the slow VCC discharge period. Advantageously, the timing of the slow VCC discharge period is plainly independent of the input voltage. At the completion of the slow VCC discharge period as timed by timer 314, controller U1 reverts to normal operation and thus begins to draw a relatively large power supply current (Icc_high) during a fast discharge period. This causes the power supply voltage VCC to rapidly discharge to below the low voltage threshold Vcc_low (which may also be denoted as a minimum threshold voltage), whereupon voltage control module 312 switches on power supply voltage switch transistor S3. The power supply voltage then rapidly charges to the high threshold voltage Vcc_st. The recycling period is repeated N times (N being a plural integer) to complete the re-startup period. The rapid charging and discharging times in each recycling period are thus insignificant compared to the slow discharge period such that the re-startup period is dominated by the N slow discharge periods. Since the slow discharge periods are independent of the input voltage, the duration of the re-startup period is reliably controlled despite variations in the input voltage. Normal operation may then ensue following completion of the re-startup period.

A method of operation for controlling the duration of the re-startup period will now be discussed. The method includes an act of responding to a fault condition by stopping normal operation of a power switch transistor and beginning the re-startup period, wherein the re-startup period extends over a plurality of recycling periods. The initiation of the recycling periods discussed with regard to FIG. 4 is an example of this act. The method also includes an act in each recycling period of charging a gate of a power switch transistor with a zener breakdown voltage to produce a source voltage at a source terminal for the power switch transistor. The production of the source voltage for power switch transistor S2 in an example of this act. The method also includes an act in each recycling period of, during a discharge period, discharging a power supply voltage stored across a VCC capacitor; and charging the VCC capacitor using the source voltage responsive to the power supply voltage dropping below a minimum threshold voltage at an end of the discharge period. The slow discharge period and subsequent fast discharge period for each recycling period is an example of the discharging act. Finally, the switching on of power supply voltage switch transistor S3 is an example of the charging act.

As those of some skill in this art will by now appreciate and depending on the particular application at hand, many modifications, substitutions and variations can be made in and to the materials, apparatus, configurations and methods of use of the devices of the present disclosure without departing from the scope thereof. For example, the discussion above was with regard to a flyback converter but it will be appreciated that the re-startup period disclosed herein may be implemented in other switching power converters such as a buck converter, a boost converter, or a buck-boost converter. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A switching power converter, comprising:
a power switch transistor;
a current limiting resistor;
a power supply voltage switch transistor coupled between a source of the power switch transistor and a first terminal for the current limiting resistor;
a VCC capacitor for storing a power supply voltage, wherein the VCC capacitor is coupled between a second terminal for the current limiting resistor and ground;
a zener diode having a cathode coupled to a gate for the power switch transistor and having an anode coupled to ground;
a resistor coupled between an input voltage node for the switching power converter and the cathode of the zener diode; and
a controller configured to control a cycling of the power switch transistor during normal operation to regulate an output voltage for the switching power converter, the controller being further configured to respond to a fault condition by ceasing normal operation and by cycling the power supply voltage switch transistor over a re-startup period, wherein the controller is configured to cycle the power supply voltage switch transistor through a plurality of recycling periods over the re-startup period.

2. The switching power converter of claim 1, wherein the controller includes a timer, and wherein the controller is configured to begin each recycling period with the power supply voltage switch transistor off during a slow discharge period for the power supply voltage during which the controller receives a first current from the VCC capacitor, and wherein the timer is configured to time the slow discharge period.

3. The switching power converter of claim 2, wherein the controller is further configured to enter a fast discharge period for the power supply voltage in each recycling period upon completion of the slow discharge period, wherein the controller is further configured to receive a second current from the VCC capacitor during the fast discharge period, and wherein the second current is greater than the first current.

4. The switching power converter of claim 3, wherein the controller is further configured to enter a fast charge period for the power supply voltage in each recycling period in response to the power supply voltage being less than a low threshold voltage at an end of the fast discharge period, and wherein the controller is configured to switch on the power supply voltage switch transistor during the fast charge period and to end the fast charge period by switching off the power supply voltage switch transistor in response to the power supply voltage being greater than a high threshold voltage.

5. The switching power converter of claim 4, wherein the controller is further configured to draw substantially no current from the VCC capacitor during each fast charge period.

6. The switching power converter of claim 4, wherein the controller further includes a voltage control module for controlling the cycling of the power supply voltage switch transistor during the recycling periods.

7. The switching power converter of claim 1, wherein the power switch transistor and the power supply voltage switch transistor are both NMOS transistors.

8. The switching power converter of claim 1, wherein a zener breakdown voltage for the zener diode is approximately 15 to 25 volts.

9. A method of controlling a duration of a re-startup period for a switching power converter, comprising:
responding to a fault condition by stopping normal operation of a power switch transistor and beginning the re-startup period, wherein the re-startup period extends over a plurality of recycling periods;
during the re-startup period, driving a gate of the power switch transistor with a zener breakdown voltage from a zener diode to maintain the power switch transistor on;
in each recycling period:
timing a slow discharge period for a power supply voltage stored across a VCC capacitor, wherein a controller powered by the power supply voltage draws a first current from the VCC capacitor;
upon a conclusion of the slow discharge period, drawing a second current from the VCC capacitor to power the controller during a fast discharge period for the power supply voltage, wherein the second current is greater than the first current;
terminating the fast discharge period responsive to the power supply voltage dropping below a low threshold voltage and beginning a fast charge period by charging the VCC capacitor using a source voltage for the power switch transistor; and
completing the fast discharge period responsive to the power supply voltage exceeding a high threshold voltage, wherein the high threshold voltage is greater than the low threshold voltage.

10. The method of claim 9, wherein the switching power converter is a flyback converter.

11. The method of claim 9, wherein charging the VCC capacitor using the source voltage comprising switching on a power supply voltage switch transistor to couple the VCC capacitor to a source of the power switch transistor.

12. The method of claim 11, wherein coupling the VCC capacitor to the source of the power switch transistor comprises coupling the VCC capacitor through a current limiting resistor to the source of the power switch transistor.

13. The method of claim 9, wherein driving the gate of the power switch transistor with the zener breakdown voltage from the zener diode comprises coupling a cathode of the zener diode to an input voltage node for the switching power converter.

14. The method of claim 13, wherein coupling the cathode of the zener diode comprises coupling the cathode of the zener diode to the input voltage node through a resistor.

15. A method of controlling a duration of a re-startup period for a switching power converter, comprising:
responding to a fault condition by stopping normal operation of a power switch transistor and beginning the re-startup period, wherein the re-startup period extends over a plurality of recycling periods;
in each recycling period:
charging a gate of a power switch transistor with a zener breakdown voltage to produce a source voltage at a source terminal for the power switch transistor;
during a discharge period, discharging a power supply voltage stored across a VCC capacitor, wherein each discharge period comprises a slow discharge period in which a first current is drawn from the VCC capacitor and a fast discharge period in which a second current is drawn from the VCC capacitor, wherein the second current is greater than the first current; and
charging the VCC capacitor using the source voltage responsive to the power supply voltage dropping below a minimum threshold voltage at an end of the discharge period.

16. The method of claim 15, wherein the second current equals an operating current for a controller for the switching power converter during normal operation.

17. The method of claim 15, further comprising: resuming the normal operation upon a completion of the re-startup period.

18. The method of claim 15, wherein substantially no current is drawn from the VCC capacitor during each fast charge period.

* * * * *